May 23, 1933.          I. D. PERRY          1,910,961
AIR VALVE
Filed June 7, 1932
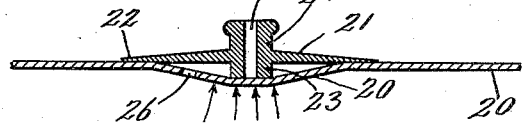
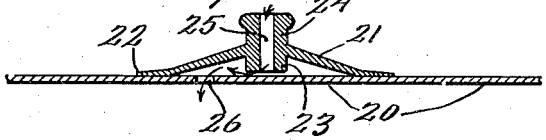
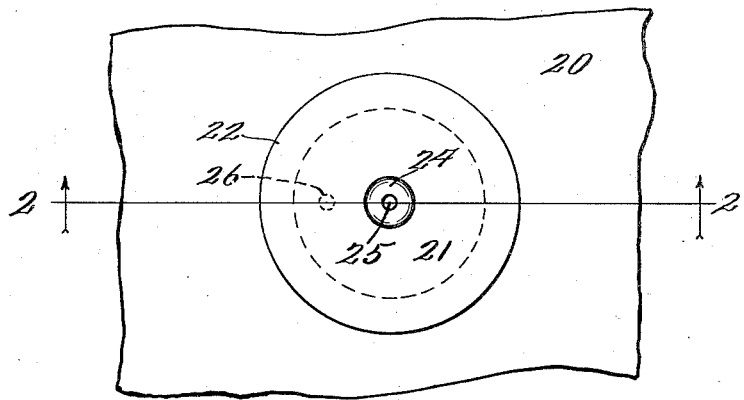
Fig. 3.
Inventor:
Ira D. Perry Patented May 23, 1933

1,910,961

UNITED STATES PATENT OFFICE

IRA D. PERRY, OF CHICAGO, ILLINOIS, ASSIGNOR TO AGNES S. PERRY, OF CHICAGO, ILLINOIS

AIR VALVE

Application filed June 7, 1932. Serial No. 615,850.

This invention has to do with improvements in air valves. The air valves herein disclosed are especially intended for use in connection with air-tight containers such as are inflated from time to time by the user, and by the mouth and lungs as a source of air supply. For example, the air valves herein disclosed may be used in connection with balloons, air inflated toys, various water toys and accessories, life preservers, and a large number of other devices which require the supply or release of air from time to time.

The main object of the present invention is to provide a very simple and inexpensive construction of air valve, one which can be readily formed on or attached to the air container, one which will present a very pleasing and satisfactory appearance when in use, one which will be positive and certain in operation, one which is self-contained and does not require the use of any tools or implements of any kind, one which will not readily get out of order, and a device which is of such nature that it does not require any special instructions or expert manipulation in order to successfully operate it.

Another object of the invention is to provide a device which may be moulded out of rubber or material from which the inflated article itself is made and also a device of very low cost of manufacture.

Another object of the invention is to provide an air valve which is well adapted for use in connection with such inflated objects as basketballs, footballs, vehicle tires, etc.

Other objects and uses of the invention will appear from a detailed description of the same, which consists in the features of construction and combinations of parts hereinafter described and claimed.

In the drawing:

Figure 1 shows a cross section through a valve member embodying the features of the present invention, the same being in the sealed or closed condition, and is a section on the line 1—1 of Figure 3, looking in the direction of the arrows;

Figure 2 shows a view similar to that of Figure 1, with the exception that the valve has been pulled into the open position and is being inflated, and is a section on the line 2—2 of Figure 3, looking in the direction of the arrows;

Figure 3 shows a face view corresponding to Figures 1 and 2.

Referring first to the construction shown in Figures 1, 2, and 3, a portion of the casing of the article to be inflated is shown at 20. The same is of sheet rubber or rubberized fabric or similar material.

The valve element comprises a circular disk 21 of rubber and the peripheral portion 22 of this disk 21 is cemented or otherwise sealed to the outside surface of the sheet 20. There is a lug or nipple 23 which reaches inwardly from the central portion of the valve disk 21 a slight distance so that when the parts are secured in their natural or normal overlying position, the inner end of this nipple 23 seats and seals against the opposed surface of the sheet 20 under tension of their combined materials as indicated in Figure 1. Such seating and sealing action is manifestly increased by the outward force exerted against the sheet 20 by whatever air pressure may exist within the container, as indicated by the arrow heads in Figure 1.

There is another nipple or lug 24 reaching outwardly from the central portion of the valve disk 20 in alignment with the nipple or lug 23; and a central bore 25 is formed through the valve device at the position of the nipples 23 and 24.

An opening 26 is provided in the sheet 20 at a point between the position of the nipple 23 and the surface of the valve disk 21 which is sealed to the sheet 20.

It will now be understood that in the normal position of the device shown in Figure 1, the sheet 20 seats firmly against the inner end of the nipple 23 and closes the bore 25 in gas-tight fashion, and the amount of this sealing action increases as the pressure within the container increases. When it is desired to either inflate or deflate the device, it is only necessary to pull the nipple 23 outwardly with respect to the sheet 20 as shown in Figure 2, whereupon the inner end of the nipple 23 will draw slightly away from the sheet 20 as shown in Figure 2, so as to establish communication between the bore 25 and the opening 26. Under these conditions, the container can be either inflated or deflated and thereafter upon releasing the valve member it will move back into the position of Figure 1, and immediately reestablish the sealing operation.

While I have herein shown and described but a single embodiment of the features of my present invention, still I do not intend to limit myself thereto except as I may do so in the claims.

I claim:

1. In an inflatable device comprising a bag of air-tight material having an air port therein, an air valve member of resilient material peripherally sealed to the material of said bag to overlie the port therein, said valve member having a ported lug projecting from the bag engaging side thereof and engaging the material of said bag, said material of the bag forming means to seal said port in the valve member to confine air at pressure in said bag.

2. An inflation valve comprising a sheet of airtight material having an air port therein, a disk-like air valve member of resilient material peripherally secured to said sheet, said valve member having a ported lug projecting from the sheet opposed side thereof and engaging the material of said sheet, the material of said sheet forming means to seal said port under tension of the combined materials.

3. An inflation valve comprising a sheet of material having an air sealing portion, an air valve member of resilient material peripherally sealed to the material of said sheet to overlie the air sealing portion thereof, said valve member having a ported lug projecting from the sheet opposing side thereof and engaging the air sealing portion of said sheet, whereby to seal the port in said lug under tension of the materials of said sheet and valve member.

4. In a wall structure for inflatable articles, an air valve composed of two valve members one of which comprises a portion of said wall and said valve members being disposed in overlying relation and connected at their adjacent boundaries, the material of one of said members being resilient, and a ported lug projecting from the inner side of one of said members engaging the opposed surface of said other member and spacing the intermediate portions of said members under tension of their combined materials, said members cooperating to exert sealing pressure by one of said members over the ported lug of said other member to confine air at pressure within said inflatable article.

IRA D. PERRY.